United States Patent [19] — Takasugi
[11] 4,053,640
[45] Oct. 11, 1977

[54] FISHING BAIT AND METHOD OF MAKING SAME

[76] Inventor: Tadashi Takasugi, No. 30-18 Kita Shinjuku 1-chome, Shinjuku, Tokyo, Japan

[21] Appl. No.: 582,397

[22] Filed: June 30, 1975

[30] Foreign Application Priority Data

May 26, 1975 Japan .................. 50-066002

[51] Int. Cl.$^2$ .............................. A23L 1/325
[52] U.S. Cl. ........................... 426/1; 426/78; 426/385
[58] Field of Search ............ 426/1, 78, 384, 77, 426/643, 385; 43/42, 41, 42.53, 42.06

[56] References Cited

U.S. PATENT DOCUMENTS

| | | | |
|---|---|---|---|
| 1,787,908 | 1/1931 | Inami | 43/42.06 |
| 2,555,088 | 5/1951 | Irwin | 43/41 |
| 3,047,975 | 8/1962 | Pretorius | 43/42.06 |
| 3,361,566 | 1/1968 | Axelrod | 426/643 X |
| 3,528,816 | 9/1970 | Nagae | 426/1 X |
| 3,730,728 | 5/1973 | Patashnik et al. | 426/1 |
| 3,854,234 | 12/1974 | Hardin | 426/1 X |

*Primary Examiner*—Raymond N. Jones
*Assistant Examiner*—R. A. Yoncoskie
*Attorney, Agent, or Firm*—Spellman & Joel

[57] ABSTRACT

This invention relates to a fish bait comprising a raw fish which has been ground and pulverized in micronized form, blended with a surface active agent, and the resulting mixture dried by a process which allows the pulverized bait to remain raw, such as by freeze-drying, pulverizing the dried bait again to a micronized form, and thereafter placing the dried and micronized bait into a water permeable container and sealing the same. When placed in the water, the bait thus manufactured, allows the taste and smell thereof to be dispersed throughout the water and thereby attracts a desired fish.

4 Claims, No Drawings

FISHING BAIT AND METHOD OF MAKING SAME

BRIEF SUMMARY OF THE INVENTION

The present invention relates to a greatly improved fishing bait utilized primarily to attract fish to an area to be caught by the usual methods such as nets, hooks and the like. The bait of the present invention is made by a process comprising the steps of making a raw bait which the fish which is desired to be caught is fond of or attracted to, pulverizing the selected bait to micronized form, thereafter blending the micronized bait with a surface active agent to facilitate dispersion in water, drying the resulting bait mixture utilizing a method which does not cook the bait but allows it to remain in its raw state, and thereafter pulverizing the dried bait mixture to a micronized form, packing and sealing the bait in water permeable paper, cloth or other similar container. The bait in the permeable container is then sealed in an outer container isolating it from moisture and air until ready for use. The water permeable container can be utilized on a hook or for dispersing taste and smell in water to attract fish to an area. The bait product resulting from the method of the present invention disperses the taste and smell of the bait rapidly in the water in which the bait container is placed by dispersion of micronized particles or solution of the bait and its contents in the water. The bait product of the present invention serves to rapidly disperse the A very little mass of bait is utilized to disperse the attractive taste and smell of the bait over the area to be fished.

DETAILED DESCRIPTION OF A PREFERRED EMBODIMENT

The raw bait utilized according to the method of the present invention is selected from such bait as moss, plankton, euphausia, worms, insects, frogs, other fish, shell fish, and the like. The function of the surface active agent which is optionally blended with the pulverized and micronized bait is to facilitate dissolving or dispersing the selected bait into the water. Surface active agents utilized are anionic salts derived from fish oil.

In order that the raw bait may be dried in a manner to preserve its raw condition, the known technique of vacuum freeze drying is utilized.

The resulting bait product prepared by this method is capable of being preserved for a long time in its essentially raw condition without the necessity for refrigeration provided it is packed in a suitable container or material capable of isolating the bait from the effects of humidity and air.

We have learned that most fish are attracted preferentially by raw and fresh baits. It is, therefore, important in finding an effective bait for fishing to utilize the appropriate bait in its raw condition. This is possible if the bait is prepared according to the present invention. Thus the bait of the present invention contained in the bait container of water permeable paper according to this invention can be attached to fishing line in sufficient quantities for the fish sought. The bait is dissolved and dispersed readily in the water to attract the fish.

According to the present invention, because the actual raw bait is in a micronized condition, what is effectively dispersed in the water from the bait bag of the present invention are the essential taste and smell of the bait. As the taste and smell from the bait is dispersed in the current of water and sensed by the fish over a wide area, the fish in the effected area are attracted to the source of the taste and smell and approach the area in which the bagged bait is contained on a fish hook or otherwise maintained at a specific point. The overall efficiency using the product of the present invention is vastly improved over previous baits.

The effectiveness of the bagged bait according to the present invention is outstanding. The taste and smell which is essentially dispersed from the bagged bait into the water attracts the fish towards the bagged bait where they may be hooked on the hook holding the bagged bait. The effectiveness has been proven time and time again in many tests. As indicated, the bagged bait according to the present invention is equally effective in dispersing the bait taste and smell for gathering fish or attracting them to be hooked.

In most instances, fishing bait previously utilized has been in solid form and thus the dissolving of the bait in the water has not been efficient. Not only is the rate of dissolution and dispersion extremely slow when solid bait is dispersed in the water, but the mechanics of such dispersion are extremely messy and wasteful, as well as unattractive. These problems are eliminated by the present invention.

As indicated, the raw bait processed according to the present invention is in a micronized pulverized form contained in water permeable paper or cloth. The amount of bait utilized can be readily adjusted by selecting standard size bags utilized in a particular area. A great flexibility in the color, shape and material of the containers utilized is possible which may further serve to attract certain desired fish.

By way of example, the permeable containing the raw bait according to the present invention can have tails or the like attached to it in order to attract attention of the fish. Another distinct advantage of the present invention is that a bait such as euphausia which in the past has been considered unusable as bait for fish hooks, when contained in the water permeable containers utilized by the present invention, can be utilized on fishing hooks.

The bait product of the present invention is made by a drying process which maintains the original bait in its raw condition. The bait products of this invention permit a fisherman to obtain the preferred bait at all times without regard to the season of the year, the location, or the particular bait utilized. The bait of the present invention is essentially in the same condition as the natural raw bait, is easy to transport and store without refrigeration.

The following examples illustrate the effectiveness of the bait of the present invention in its convenient form compared to fish gathering bait hitherto used. The fishing bait usually used is often put in a cloth or metal mesh bag attached to a line. The cloth bag was designed to let the bait out from the opening at the top of the bag. In the case of the metal mesh container, the bait was dispersed through the mesh. In most cases the bait employed in these prior art methods was simply grossly chopped fish meat in solid form. The metal mesh and opening of the bag was always relatively large and thus when the bait was dispensed into the water, it was quickly depleted. Because it was in rather large pieces, its taste and smell was never dispersed over a wide area and the quantity of bait was quickly depleted. In the case of deep-water fishing the previous forms of bait utilized was nearly completlely run out before it sunk to desired depths. An additional disadvantage of previous bait was that the gross and solid bait after being dispersed in the water moved away from the position of any hooked bait because of water currents. In such cases, the gap or distances between the bait utilized to attract fish to the area by dispersing the bait in the water and the bait on fish hooks increased relatively quickly. The fish attracted to the fish gathering bait often followed the bait as it drifted away from the hook or net area with the result that the contact between the fish and the hooked bait was lost.

The container of the present invention does not have any opening. When the bagged bait of the present invention is placed in the water, the micronized bait serves to dispense the taste and smell of the raw bait in the water through the minute pores of the paper cloth or similar materials. Bait according to the present invention is effective for attracting fish over a much longer period of time than fish gathering bait previously employed. It is important to remember in considering the effectiveness of the present invention that fish have a very sharp sense of smell and taste for bait and they can perceive even minute quantities of the bait through the smell and taste in the water. Thus, the present invention greatly increases the efficiency of the bait that is actually utilized.

Tests utilizing the bait of the present invention have confirmed that as the taste and smell of the bait are continuously dispersed in the water, the fish in the area perceive the taste and smell and are attracted towards the source of the taste and smell, i.e., the bagged bait, which can be hooked from the fish hook. When the fish first perceive minute quantities, they seek after the area where the smell and taste is more concentrated.

Previous methods in which the fish gathering bait was effectively dumped and cast in gross and large amounts often resulted in an unwanted effect since although it initially attracted the fish, they ultimately were lost when the fish returned to the school. This is because so much of the bait was dumped into the area that the fish attracted to it ate the bait, satisfied their appetites, and then moved away from the net area or the hooked bait.

In contrast, however, the bait of the present invention functions to gather fish solely by their being attracted through the taste and smell of the bait. The appetite of the fish is never actually satisfied through the bait and thus the attracted fish are continuously and permanently retained around the hooked bait causing the fish to search for the bait more intensely than ever until they eventually are stimulated to snatch at the hooked tangible bait in the area.

ILLUSTRATIVE EXAMPLE 2 lbs. of raw euphausia is pulverized to a micronized form. Thereafter 0.05 lbs. of an anionic surface active agent are added to the euphausia and mixed therewith. The mixture is then dried by utilizing a vacuum freeze drying technique. Approximately 0.6 lbs. of the resulting product is then pulverized. The thus pulverized bait product is placed in bags comprised of poromeric paper coated with polypropylene. Each bag contains approximately 0.02 lbs. of the micronized bait. The bag is heat sealed to seal the micronized bait in, and the seal does not come apart when placed in water.

For purposes of distribution, approximately twelve such bags are sealed in a container which is capable of isolating the bait from humidity and air. At time of use, one or more of the bagged bait units is taken out and hooked on the fish hook. The remainder are sealed again for indefinite preservation. The selected bait is then utilized as described above.

I claim:

1. A fishing bait for attracting fish, said bait being made by (a) pulverizing raw bait to a micronized bait form, (b) mixing the micronized bait of (a) with an anionic surface active agent derived from fish oil in an amount necessary to promote dispersing said micronized bait in water, (c) vacuum freeze drying said micronized bait, and (d) again pulverizing the dried bait from (c) to micronized form.

2. A fishing bait as claimed in claim 1 wherein said raw bait is euphausia.

3. A fishing bait product comprising the fishing bait of claim 1 sealed in a water permeable bait bag.

4. A fishing bait product as claimed in claim 3 wherein said bait bag is comprised of poromeric paper coated with polypropylene.

* * * * *